United States Patent [19]
Hechler, IV

[11] 3,709,259
[45] Jan. 9, 1973

[54] HAND OPERATED LOW PRESSURE VALVE

[76] Inventor: Valentine Hechler, IV, 26 Meadow View Road, Northfield, Ill. 60093

[22] Filed: April 26, 1971

[21] Appl. No.: 137,540

[52] U.S. Cl............................137/630.15, 251/172
[51] Int. Cl..................................F16k 1/00
[58] Field of Search.....................137/630.14, 630.15

[56] References Cited

UNITED STATES PATENTS

| | | | |
|---|---|---|---|
| 1,821,206 | 9/1931 | Caswell | 137/630.14 |
| 3,326,240 | 6/1967 | McConnaughay | 137/630.14 |
| 2,966,167 | 12/1960 | Jensen | 137/630.15 X |

FOREIGN PATENTS OR APPLICATIONS

| | | | |
|---|---|---|---|
| 1,119,712 | 4/1956 | France | 137/630.15 |

*Primary Examiner*—Robert G. Nilson
*Attorney*—Harbaugh & Thomas

[57] ABSTRACT

A valve within a valve is described wherein the opening of the former reduces the opening pressure of the latter. A lost motion reciprocating linkage is provided between the valve actuating rod and the main valve to open a small inner port prior to the opening of the main valve. The linkage allows the valve to be self-closing. In one embodiment the main valve is axially supported on a cage and opens in the direction of the inlet flow to the valve. The valve operating rod carries a small inner valve that seats in a passageway through the main valve and the rod engages the cage at spaced points whereby actuation of the rod opens the small valve first against the flow of fluid, thus relieving a substantial amount of the pressure holding the main valve closed. Further movement of the rod engages the cage to open the main valve with less effort. Both valves are held open by the rod until its release whereby the flow of fluid around the cage and the small valve and around the large valve causes sufficient fluid friction to close both valves automatically. The opening force on the actuating rod can be applied from either end and the valves can be variously oriented in a valve housing according to the embodiments disclosed.

13 Claims, 7 Drawing Figures

PATENTED JAN 9 1973

INVENTOR:
VALENTINE HECHLER IV

By Harbaugh & Thomas
Attorneys

INVENTOR:
VALENTINE HECHLER IV
By Harbaugh & Thomas
Attorneys

INVENTOR:
VALENTINE HECHLER IV

HAND OPERATED LOW PRESSURE VALVE

BACKGROUND OF THE INVENTION

The valves normally used in systems conveying a fluid at pressures of 100 psi or less, are generally operated by a rotatable valve spindle which engages in a quick thread housing to gain maximum opening distance per turn. All of the parts except the valve seals are composed of rather expensive cast and machined metal parts. Quick-opening plug valves composed of lightweight plastic are available for use in the low-pressure garden hoses and lawn sprinkling systems. Both of these types of valves are adjustable and can be set at desired openings to control the flow of fluid as in other valves employing rotation of a valve stem for opening and closing.

The closing and sealing actions of the spindle valves are dependent upon the torque applied to the valve handle which in turn can result in a more difficult opening of the valve especially if the valve parts corrode in the shut-off position or the gasket seal tends to stick. Plug valves made of plastic have a tendency to leak in the closed position.

In the art of garden spray equipment, lawn sprinklers, and liquid actuated spray devices, there is a need for an easily opened quick-operating valve which resists the tendency to freeze shut and is easily opened and maintained in the open position while at the same time providing an easily operated closing action. The valve must also be inexpensive to manufacture and exhibit a long life but need not be finitely adjustable to vary the rate of flow. The instant invention is directed to providing such a valve.

SUMMARY OF THE INVENTION

Accordingly, this invention concerns a valve that is easily operated for light finger pressure, exhibits a low pressure drop at high rates of flow, has a non-varying nozzle setting, and exhibits a positive, reliable internal valve action over a full range of fluid pressures and flow rates. The valve of this invention is adapted for incorporation in convenient form in various thumb or finger operated nozzles. The valve closes with and mainly because of the pressure source and the flow of fluid through the valve and past the valve cage tends to close the valve. The force necessary to hold the valve open is negligible. This force becomes greater with increasing increments of closing position. The self-closing feature is particularly advantageous when the terminating restriction on the outlet or nozzle is not sufficient to create a significant back pressure. The resilient valve seat of the larger valve acts as a shock absorber on closing and the taper on the large valve permits automatic seating and in turn less friction on opening. The size of the smaller pressure release valve is related to the size of the large valve so hat its apparent size does not change from the opening to closing positions and thereby the opening resistance of the valve is constant. The valve of this invention is a snap-action valve both in opening and closing. The effectiveness of the valve takes advantage of the initial pressure drop in the inlet bore upon initial opening of the small valve; the nozzle pressure on the other side of the valve builds up to decrease the pressure differential across the larger valve. Consequently flow through the smaller valve causes further reduction in this differential pressure. Also the inside port area is effective in reducing the large port area and thereby reduces the area upon which the differential pressure acts. And finally, there is a sudden reduction in power immediately after each valve is opened which forces are in the direction of ease of operation.

DESCRIPTION OF THE DRAWINGS

Illustrative embodiments of the invention are shown in the drawings wherein.

DESCRIPTION OF THE PREFERRED EMBODIMENTS

Figure 1:
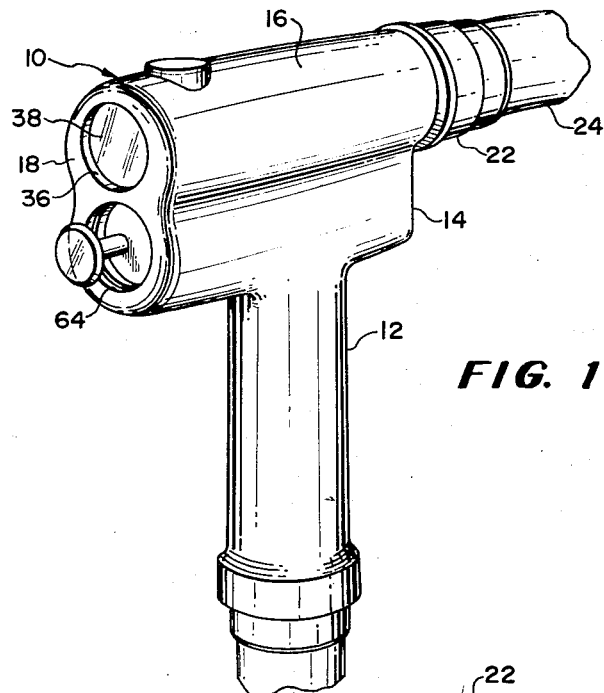
FIG. 1 is a perspective view of one form of valve and nozzle of this invention.
Figure 2:
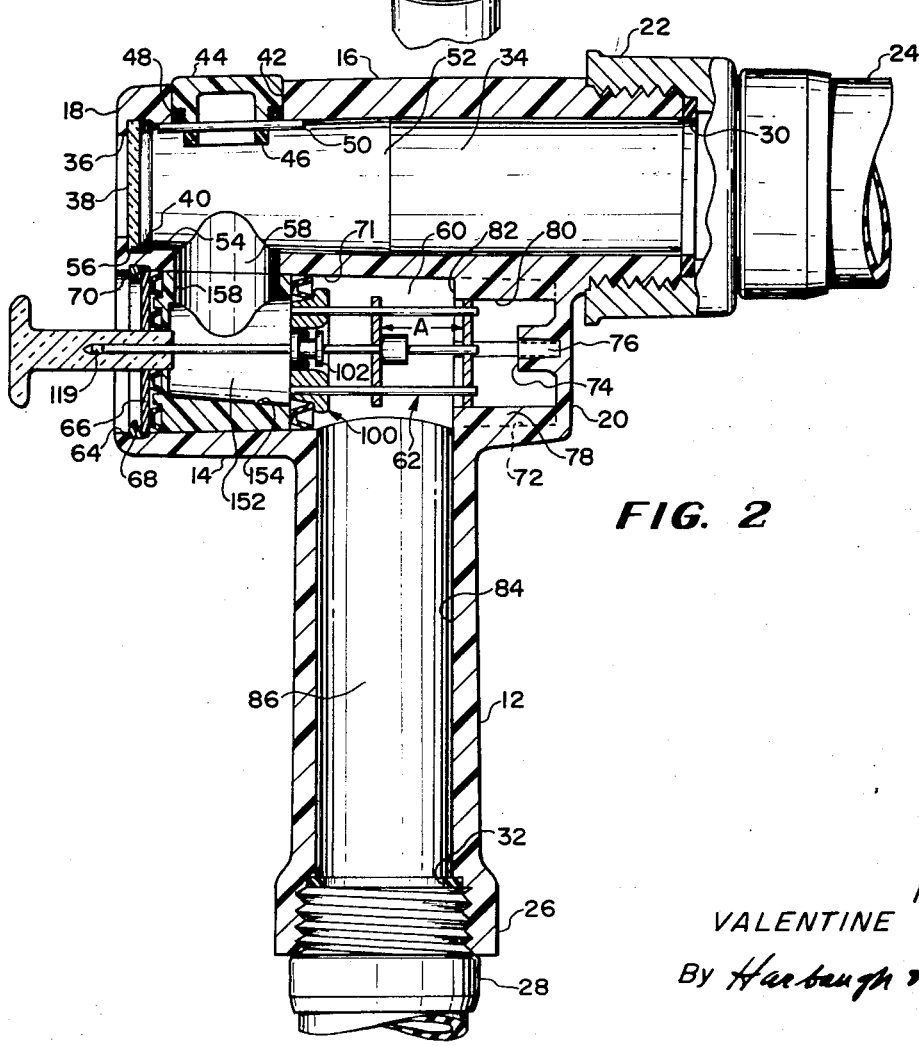
FIG. 2 is a partial cross-sectional view of the embodiment shown in FIG. 1 with the valve ports in the closed position.

Referring to FIG. 1, there is shown a housing 10 having the shape of a pistol which is preferably formed of a lightweight, impact resistant plastic. The housing 10 is molded or cast to form the handle member 12 in a convenient pistol grip form integral with the rectangular elongated base portion 14 which widens to the top tubular section 16. The end walls 18 and 20 (FIG. 2) are also integral parts of the molded housing.

The top tubular section 16 is externally threaded (see FIG. 2) to receive the coupling 22 that is attached to a hose 24 which may be connected to a suitable spray nozzle, or the like defining the discharge end of the device. The handle 12 has the flared end 26 which is internally threaded to receive the coupling member 28 defining the inlet end of the device. Suitable rubber or plastic gaskets 30 and 32 are used to effect a seal at these couplings.

The section 16 of the housing 10 defines therein the cylindrical passageway 34 therethrough which communicates through the coupling 22 to the hose 24. The other end of the passage 34 is closed by the wall 18 except for the opening 36 defined by a flanged edge against which the sight glass 38 is held in sealed relationship by the O-ring seal 40. The top wall of the section 16 has the clean-out opening 42 closed by the plug 44 having the inwardly off-set circumferential flange 46, held in place and sealed by the O-ring 48 and the pin 50 which engages through suitable diametrically positioned bore holes in the flange 46. Other forms of clean-out plugs can be used. The passageway 34 is essentially cylindrical from the nozzle end to the center line 52 at which point it tapers slightly toward the wall 18 so that the wall 54 defines an opening of smaller diameter than the passageway 34 and then widens slightly at the annular recess 56 to provide a seat for the sight glass 38 and the O-ring seal 40.

Figure 3:
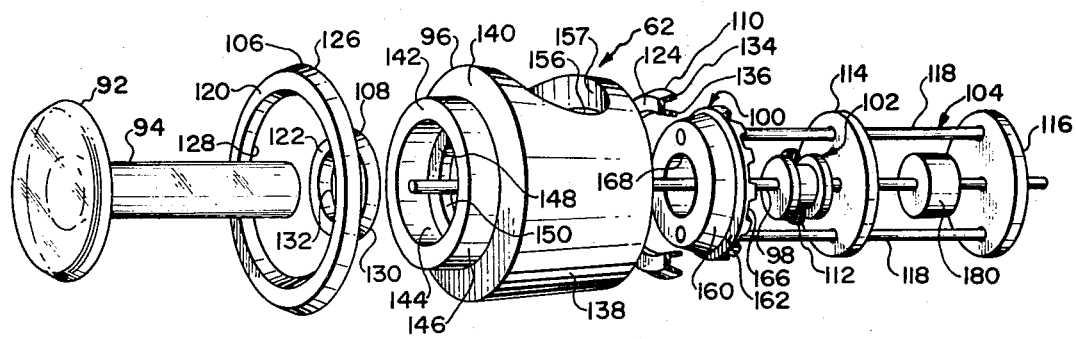
FIG. 3 is an exploded view of the valve parts without the housing and nozzle.

The passageway 34 has the connecting opening 58 substantially opposite the clean out opening 42 that communicates with the valve chamber 60 defined by the section 14, containing the valve assembly 62 (shown in detail in FIG. 3). Still referring to FIG. 2, the valve chamber 60 has the end opening 64 in the wall 18 which is sealed by the disc-shaped wall member 66 seated upon the O-ring or gasket 68 which fits into a suitable annular groove 70 provided in the valve chamber 60. The wall of chamber 60, indicated at 71, tapers slightly in a direction opposite the passageway 34 so that it is larger at the opening 64 than at the end 72 where it is closed by the wall 20.

The end wall 20 has the inwardly protruding boss 74 having the blind bore 76 located substantially along the central axis of the elongated conical passageway or chamber 60. The conical wall 71 defining the passageway 60, is smooth and uniform throughout its length and circumference except for the fluted section adjacent the wall 20 wherein the radial circumferentially spaced internal lands or ribs 78 are provided about the boss 74. The lands 78 have uniform cylindrical inner edges 80. The lands 78 are planar and radially spaced about the fluted section and at least three and preferably four such lands would be molded into the wall 71. The inner ends 82 of the lands 78 lie in a plane generally coincident with the nearest portion of the wall 84 of the inlet passageway 86 along one side. The latter passageway can be any tubular configuration and is about the same diameter as the passageway 60 at the intersection. In general the flow areas of the passageways 86, 60 and 34 are substantially equal although such construction is not necessary to the operation of the valve assembly 62, the details of which are shown in FIG. 3.

The valve assembly 62 includes the handle member 92 and its integral stem 94, preferably composed of molded plastic, the valve seat member 96, the actuating rod 98, the main valve member 100, the secondary or pilot valve 102 and the lost motion cage assembly 104. The assembly 62 is a unit except for the replaceable pair of sealing gaskets 106 and 108 and the valve gasket 110 along with the O-ring seal 112 carried by the inner spool valve 102 with the guide discs 114 and 116 being affixed to the pair of support rods 118 which extend from and are attached to the main valve member 100. The rods 118 extend into suitable or radially spaced bores in the main valve 100, and through suitable bores in the guide discs 114 and 116.

The stem 94 has the blind bore 119 (see FIG. 2) which receives the extended end of the actuating rod 98. This juncture can be a press-fit or joined by means of a plastic cement or suitable solvent cement. The rods 118, of which at least two are used are similarly affixed to the main valve 100 and to the discs 114 and 116 to form the case assembly 104.

The gaskets 106 and 108 and the valve gasket 110 are V-shaped gaskets with flat bases 120, 122 and 124 respectively and outer and inner flared flanges 126 and 128 for gasket 106; and outer and inner flared flanges 130 and 132 for gasket 108; and outer and inner flared flanges 134 and 136 for the gasket 110. These parts being particularly identified because of their functioning in the operation of the valve assembly 62.

The valve seat member 96 has the smooth conical outer surface 138, the flat end portion 140, and the circumferential flange 142 having a tubular configuration with a uniform internal and external seating surfaces indicated at 144 and 146. The internal radial flange 148 defines the center bore 150 at this end of the valve seat member which communicates with the interior passageway 152 (FIG. 2) therein defined by the internal conical wall 154. The wall 154 has a taper opposite that of the wall 71. The inlet end of the opening 152 of the valve seat member 96 is indicated at 156 (see also FIG. 4) and the outlet opening is defined by the bore hole 158, which intersects therewith. The opening 158 coincides and registers with the opening 58 in the assembled condition of the valve.

The end wall 159 (FIG. 4) of the valve member 96 is flat, radial and uniformly smooth throughout its circumference. The main valve member 100 is plug shaped having the tapering or conical valve surface 160 and the circumferential valve seat 162 having a sharper taper and terminating in the radial flange 164 with a plurality of castellations or flutes 166 thereabout.

The main valve member 100 also has the central opening 168 which is flared at one end to define the internal valve seat 170 and has suitable bores extending parallel to its central axis to receive the coupling rods 118 therein. The coupling rods, of which two or more may be used, are of equal length and extend through the pair of spaced guide discs 114 and 116 through suitable bores as indicated at 174, the junctures of which are fixed by cementing or other suitable means. The discs 114 and 116 have central bores 176 and 178 respectively which axially support and slidably receive the valve stem 98.

The guide disc 116 fits within the radial lands 78 in guided relationship, the cylindrical edges 80 of which provide a minimum friction bearing surface for this disc. The valve stem 98 carries two moving parts, namely the inner pilot valve 102 and the stop member or collar 180 in fixed spaced relationship therealong. The inner valve member 102 is generally cylindrical and is provided with the pair of spaced radial flanges 182 and 184 defining an annular recess 186 therebetween which receives the O-ring gasket 112. The flange 182 is of lesser diameter than the internal valve opening 168 in the main valve 100, while the O-ring 112, when in position on the inner valve 102, has a diameter that is larger than flanges 182-184 and also slightly larger than the internal diameter of the valve opening 168, but of lesser diameter than the conical valve surface 170. The flange 182 is preferably about the same diameter as the flange 184, so that this member can be assembled on the shaft 98 as shown or the reverse of that shown.

In the assembled position of the parts it is seen (FIG. 4) that the chevron gasket 106 fits around the outside of the flange 142 while the gasket 108 fits around the inside of this same flange with the flat surfaces 120 and 122 seated against the bearing disc 66. The disc has a central bore 190 which engages the stem or shank 94 of the handle 92 in free sliding relationship with the other end of the shaft 98 opposite the blind bore 76. The external flange 130 of the gasket 108 expands against the shank 94 to provide an effective seal under the compression of the disc 66. The juncture of the surface 138 and the wall 71 is sealed by the outward expansion of the flange 126. Thus, the handle 92 of the shaft 98, the inner valve 102 and the collar 180 are unitized and are slidably mounted in and guided by the opening 190 and the openings 176 and 178 within the limits of the distance "A" (FIG. 2) between the discs 114 and 116. This distance can be varied by variations in the length of the actuating rod 98, the depth of the blind bore 76, the thickness of the collar 180 or the distance "A" between the discs 114 and 116.

Figure 4:
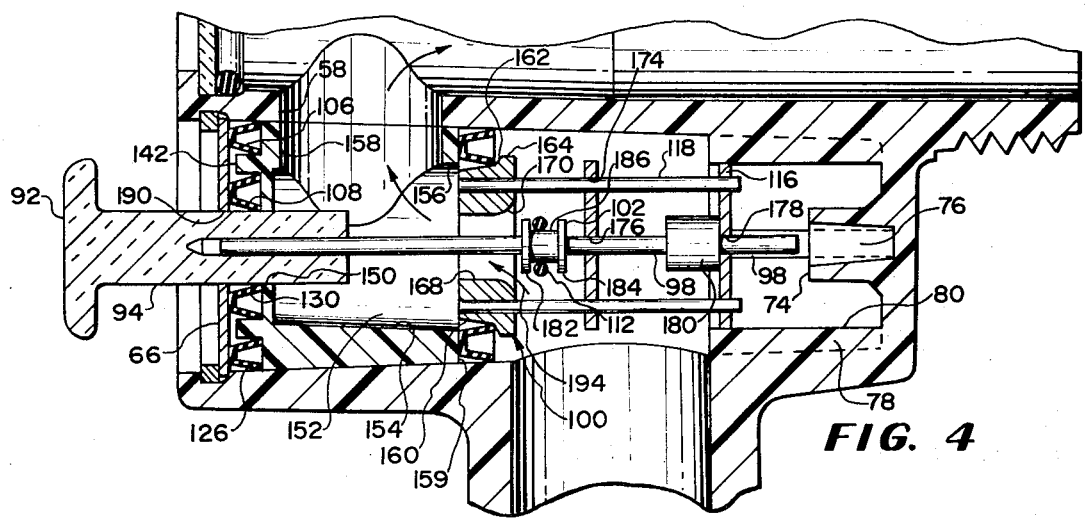
FIG. 4 is a fragmentary cross-sectional view like FIG. 2 showing the valve in the partially opened position or first stage of operation.
Figure 5:
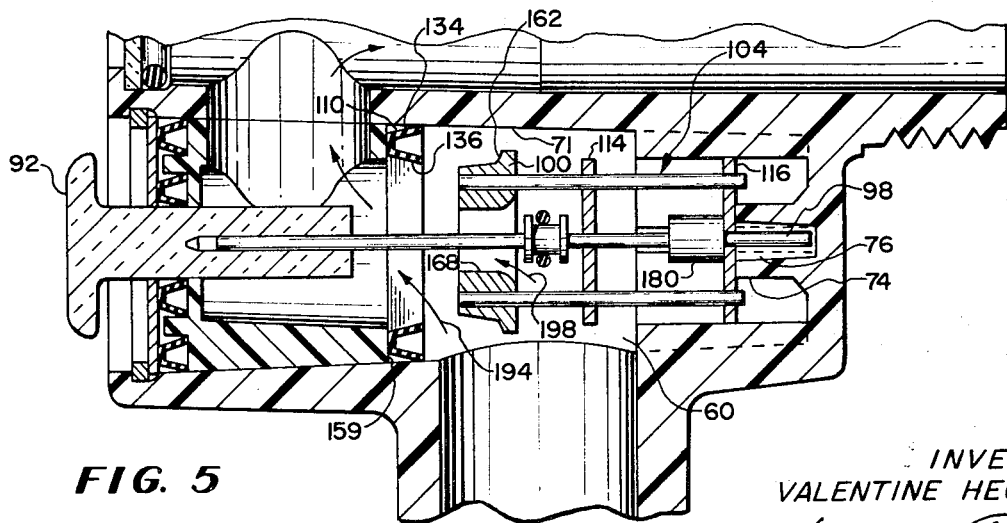
FIG. 5 is a view like FIG. 4 with the valve in the open position.

FIG. 4 shows the first or break-open position of the valve wherein the handle 92 has been pushed to its first position, opening the inner valve 102 and bringing the collar 180 into contact with the disc 116. Partial flow through the valve is shown by the arrows 194 and the rod 98 has extended toward the blind bore 76. FIG. 5 shows the second or wide open position of the valve 100 with the handle 92 pushed all the way in, whereby the collar 180 carries the disc 116 of the lost motion case 104 against the boss 74 with the end of the rod 98 in the blind bore 76. Full flow of fluid through the valve is indicated by the arrows 194 and 198. The disc 114 is still within the chamber 60 and is impinged upon by the passing fluids that circulate therearound. The handle 92 must receive a pressure of about 2 lbs. in order to maintain the valve in the full open position of FIG. 5.

It is to be observed that the gasket 110 remains seated against the face 159 and within the wall 71 against which the outer flange 134 is seated. The inner flange 136 is against the flow of fluid through the valve and defines the limits of the valve opening.

Figure 6:
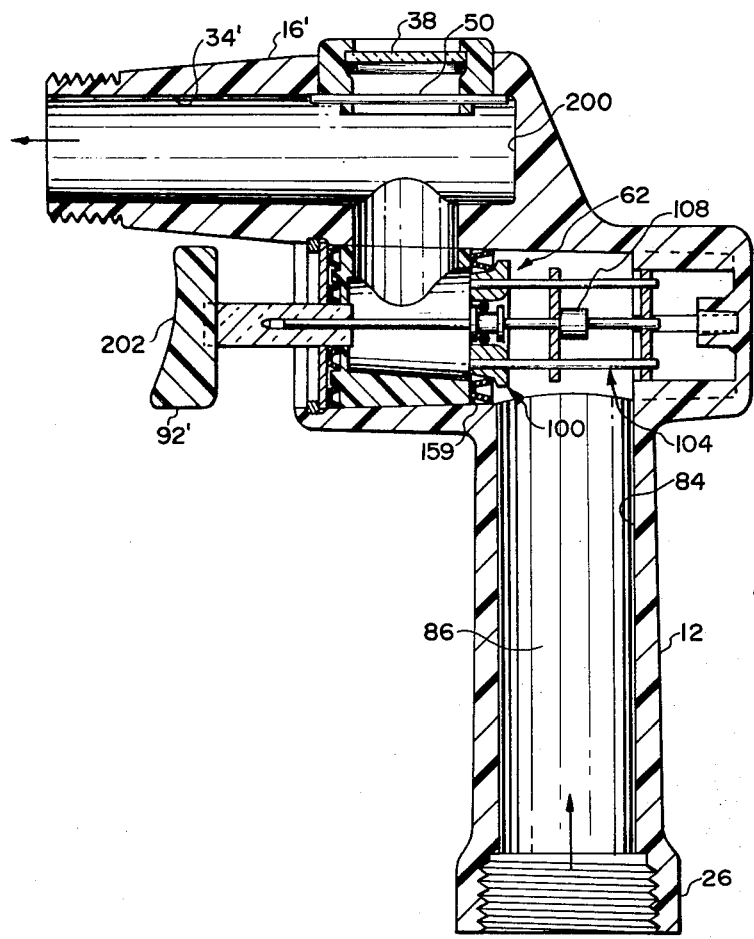
FIG. 6 is a cross-sectional view of a modified housing and nozzle with the valve in the closed position.

In FIG. 6 the valve assembly 62 just described is shown mounted in the closed position within the modified housing wherein the top section 16' is provided with the end wall 200 and the exit chamber 34' opens in the opposite direction from that shown in FIGS. 1–5. The cleanout plug 44 is omitted in this embodiment but the pin 50 is used to mount the sight glass 38. The handle 92' modified to provide a contoured face 202 to receive the finger of the user in a trigger-like position. The other essential parts are the same and accordingly need not be described in detail.

Figure 7:
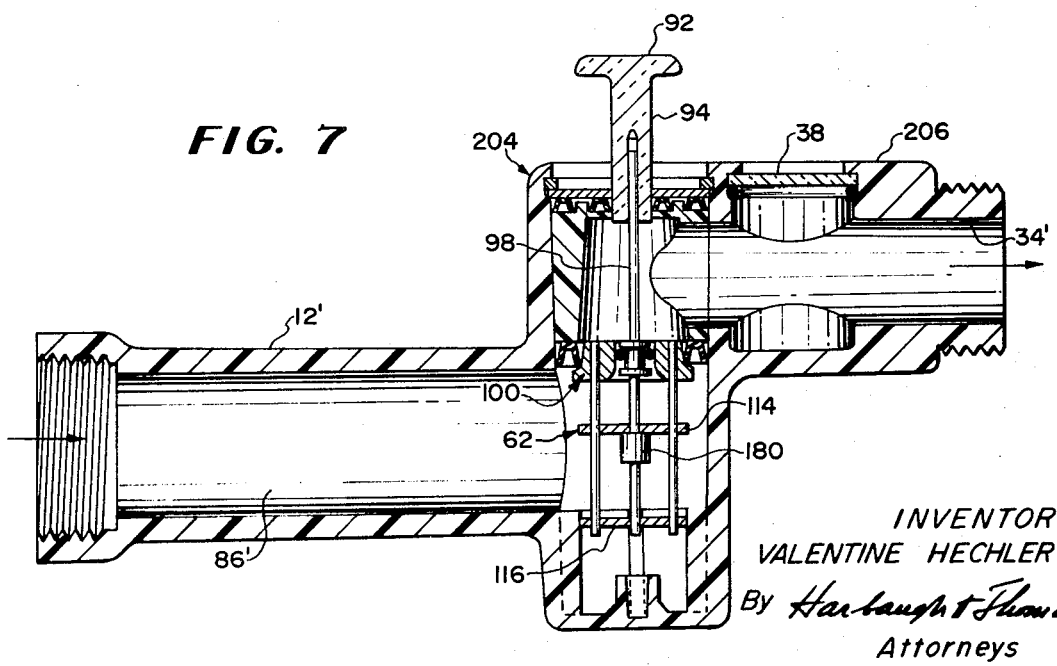
FIG. 7 is a cross-sectional view of another modification of the housing and nozzle with the valve in still another position therein.

FIG. 7 shows the valve assembly 62 mounted in a vertical position within a modified housing 204 wherein the essential difference is the location of the sight glass 38 in the top wall 206 and the relocation of the handle section 12'. Again the valve assembly operates the same as in the previous embodiments and the main parts are indicated by identical numerals or prime numerals, for easy identification.

A detailed mathematical analysis of the valve action was made. This is summarized as follows, based on the following dimensions of the parts;

| | |
|---|---|
| Shaft 98 | 0.090" diameter |
| Port 168 | 0.221" diameter |
| Pilot valve 102 | 0.240" diameter |
| and | |
| Shaft 98 | 0.090" diameter |
| Port 168 | 0.512" diameter |
| Pilot valve 102 | 0.240" diameter |

On a given valve connected to water at a pressure of 60 psi the actual measured force to move the valve to the first position shown in FIG. 4 was 4.0 lbs. The calculated opening force was 2.31 lbs. This indicates a 75 percent increase due to the mechanical friction of the "O" ring seal 184 within the valve opening 168. When the "O" ring was first installed it was lubricated and the opening force was measured at 2.0 lbs. By providing for less diametrical squeeze on this "O" ring a lesser differential would be experienced and the use of a smaller port 168 could also lessen the initial opening force. The use of a non-corrosive "oilite" material for the smaller valve parts would further lessen the opening pressure.

A calculation of the nozzle pressure when the small port 168 is open was made and found to be 24.6 psi. The actual measured nozzle pressure was 24. psi. Also in this valve the quantity of flow through the valve when the small port margin was found to be 0.754 (ft³/min) while the measured flow was 0.8 (ft³/min). This is a close check and indicates the effectiveness of the rounded orifice type of port 168 in producing stream-lined flow. The pressure drop due to the small valve when a large size lawn nozzle is used is about 22.5 psi, representing a rather large drop. With a spray wand attached the pressure drop would be small due to the small orifices in the spray wand. Thus, only the first position of the valve can be used for some operations with the advantage of a very short operating stroke.

The closing force acting against the button or spigot valve 102 was calculated at 1.40 lbs. while the measured force was found to be about 1.5 lbs. on the average. To determine the opening force required for the larger valve 100, account is taken of the fact that as the flow through the small port is proceeding, there is a reduction in pressure in the chamber 86, the high pressure side of the valve due to the velocity increase of the flow as it enters the stream lines of the port 168. The pressure on the back side or in the chamber 152 is essentially uniform. The net force was calculated to be 3.50 lbs. and to obtain the force in the small valve 102 the valve 1.40 must be added thereto, bringing the total force to 4.90 lbs. The actual measured force was about 6.0 lbs. The difference (6.0 − 4.90) or 1.10 lbs represents the mechanical friction of the seal against the valve or an increase of about 22 percent. The nozzle pressure when the large valve 100 is open was calculated to be 39.0 psi. The measured pressure drops along the path through the valve particularly in the area around the large valve and through the port 158. The total measured drop due to the spray gun was 4.5 psi.

The quantity of flow when the large valve 100 is open was calculated to be 0.965 (ft³/min) and the measured flow was 1.00 (ft³/min). This close check supports the correct selection of co-efficient of discharge and also that the pressure drop due to the valve alone is only 2.5 psi at a flow rate of 1.0 (ft³/min) or 7.5 gals. per min. which is the maximum rated capacity of some of the commercially available small proportioning and mixing pumps. The closing force when the large port 168 is open was calculated at 2.03 lbs. while the measured force was 2.0 lbs. on the average.

Without the small port 170 and with only the large port 136–156 to be opened, the opening force was calculated to be 13.35 lbs. To this value the valve friction force must be added which will be higher than the previous value of 1.10 lbs. since the incoming pressure is 60 psi instead of 47 psi. This will bring the opening force without the small valve to a value in the order of 15.5 or more lbs. The actual measured force with the small valve locked and prevented from opening was found to be 15 lbs. This force is 2 ½ times as great as the force required to open the valve with the valve within a valve arrangement of this invention. This is due to several factors. The initial water pressure drops in the inlet side of the valve with just the small valve port 170 open. The nozzle pressure on the other side of the valve builds up, decreasing the differential across the large valve. The flow of water through the small valve causes a further reduction in the differential pressure. The inside port area is subtracted from the large port area when considering the area the differential pressure acts upon. Furthermore, the movements of the valves are snap-actions due to the sudden reduction in pressure forces right after each valve is opened.

Various materials of construction can be used to fabricate the valve of this invention. For some purposes the valve can be constructed entirely of plastic. The sight glass 38 can be made of a clear plastic such as an acrylic and the rods 118 of a high strength styrene or ABS plastic. A wide variety of plastics can be used to mold the housing, the main valve 100 and the small spool valve 102, as well as the discs 114 and 116. The gasket 68 can be a metal C-ring which snap fits into the groove 70 to hold the end wall member 66 in place. Preferably, the valve members 100 and 102 are constructed of a pressed powdered metal such as "Oilite" or other metallics. The pin 50 and rods 98, 116 and 118 are preferably made of stainless steel. The handle member 92 can be made of glass where corrosion may be a problem.

The valve assembly of this invention can be used with a housing passageways and a valve chamber having different configurations than those illustrated. Any housing member defining an elongate valve chamber and spaced inlet and outlet passageways can be used. The passageways and valve chamber can be any tubular form and have different cross-sectional areas. The valve chamber wall 71 can be other than circular in cross-section and need not be tapered or frusto-conical in form although this form facilitates assembly and proper orientation of the valve assembly. In one embodiment that portion of the valve chamber from the end retaining edge 159 to the end wall 20 can be cylindrical while the portion of the wall receiving the valve seat or plug member 96 can be tapered.

Likewise, the internal bores of the valve seat or plug member can be other than circular and also the outlet opening 58 need not be formed as shown to coincide exactly with the top opening 158 of the plug member 96. The flange 142 can be omitted although the configuration shown provides means to retain the gasket members 106 and 108 thereon and also provides a fixed base against which the resilient flanges 128 and 130 rest as the closure 66 presses thereagainst to expand the outer flange 126 and the inner flange 132 against the valve chamber wall and shank 94, respectively.

For some purposes the end retaining edge or surface 159 can function as a valve seat without the resilient gasket 110 being used. However, the gasket 110 is particularly advantageous since it cushions the closing action of the valve 100 and provides a leak-proof seal that is easily opened if it becomes worn, or loses its efficiency.

A slight clearance between the sides of the O-ring 112 and the flanges 182 and 184 of the pilot valve member 102 is provided to allow this seal to roll axially therealong as it mates within the central pilot valve opening 168. The distance between these flanges can be about twice the thickness of the body of the O-ring, as illustrated. The rolling action of this valve ring makes it self-cleaning and facilitates the seating thereof.

The dimensions of the parts making up the lost motion connection between the valve actuating stem 98 and the main valve 100 are subject to variation as desired. Normally, the distance "A" (FIG. 2) between the radial support discs 114 and 116 will be sufficient to cause full opening of the pilot valve when the linkage is in the first or partly open position shown in FIG. 4. The remaining thrust distance of the actuating stem 98 to attain the second position of the valve shown in FIG. 5 is sufficient to move the main valve 100 to full open position while maintaining both the spool valve and the main valve in the path of the flow of fluid through the valve chamber. In this position the radial disc support 114 is also in the path of flow and augments the self-closing action of the valve. The force necessary to hold the valve open can be varied by adjustment of the distance "A" or lengthening the guide chamber defined by the lands 78. If desired, the flange 184 can be enlarged radially to increase the flow resistance and closing pressure on the valve. At least one of the support discs 114 or the equivalent is maintained in the path of flow in the full open position of the valve for greater operating efficiency and a positive snap-shut action.

The boss 74 can be eliminated or equivalent stop means used, such as the ends of the axial support rods 118 striking the inside of wall 20. These latter members need not be rod-like, although a maximum opening around the disc 114 and between this disc and the main valve 100 is preferred. Any changes in structure which may interfere with the smooth axial sliding action of the valve assembly should be avoided. The disc 114 can be of larger diameter than disc 116 since it does not enter the lands 78. The lands 78 can be omitted provided means are included to allow the reciprocating of the disc support 116 in this guide chamber. Thus, holes can be provided in disc 116 so that the compression forces during reciprocation are eliminated or controlled. The lands 78 provide a guide surface of minimum contact area and any rotation of the valve assembly within the housing during use or assembly, after cleaning, in a different radial attitude within the valve chamber, changes the points of wear on the disc 116. The lands 78 need only be long enough to slidably support the disc 116. The bore 76 in the boss 74 can be used to hold the stem 98 central of the valve chamber at this extended end as an aid to assembly.

What is claimed is:

1. A valve comprising:
   a housing member defining an inlet passageway, a valve chamber and an outlet passageway for conveyance of a fluid under pressure therethrough;
   a main valve seat in said valve chamber;
   a valve assembly reciprocatably guided within said valve chamber;
   a main valve member included in a said valve assembly adapted to register with said main valve seat in the direction of flow of said fluid;
   said main valve member having a valve seat opening therethrough;

a pair of spaced guide members attached to said main valve member;

valve actuating means extending to said valve chamber in sliding relationship with said guide members with one portion thereof operable for engagement external of said housing for reciprocatable movement axially within said valve chamber in a direction against the flow of said fluid;

a secondary valve member carried by said valve actuating means in operable relationship with said valve opening of said main valve member; and connecting means between said valve actuating means and said valve assembly said connecting means providing a stop member affixed to said actuating means retaining said valve assembly in one position against the pressure of said fluid with said main valve member exerting a closing force against said main valve seat while second secondary valve member is open; and providing a second position wherein said stop member retains said valve assembly with both said main valve member and said secondary valve member in open relationship with their respective valve seats.

2. A valve in accordance with claim 1 in which: said main valve seat includes an annular resilient seal member presenting an inwardly directed circumferential flexible flange portion extending toward incoming fluid and engaged by the periphery of said main valve member to effect the closure of said valve.

3. A valve in accordance with claim 2 in which:
the periphery of said main valve member defines a tapered outer surface with a radial flange larger than the internal diameter of said flexible flange portion of said valve seat.

4. A valve in accordance with claim 1 in which:
said valve chamber is provided with a guide chamber encompassing one of said guide members; and
said guide chamber is in open communication with said inlet passageway.

5. A valve in accordance with claim 4 in which:
said one guide member comprises a disc;
radially spaced elongated supports are provided between said main valve member and said disc whereby fluid access is provided about said valve assembly exerting a constant closing pressure on said valve members.

6. A valve in accordance with claim 1 in which:
said valve chamber has an open end through said housing and is defined by a surface of revolution tapering from said open end and intersecting said outlet and inlet passageways;
said main valve seat comprises a separable valve seat member seated in said tapered valve chamber and having an end wall defining said main valve seat peripherally between said outlet and inlet passageways;
an opening with said valve seat member communicating from said inlet passageway to said outlet passageway;
said valve seat member having a base wall facing and spaced inwardly from said open end of said valve chamber with a central guide opening for said actuating means;
closure means within said open end sealing against said base wall; and an annular resilient seal member against said end wall presenting an outer circumferential flexible flange portion circumferentially sealing the periphery of said valve seat member with said valve chamber;

and presenting an inner circumferential flexible flange portion about said opening therein for engagement with said main valve member.

7. A valve in accordance with claim 1 in which:
said secondary valve member comprises a spool valve with spaced radial flanges and having an O-ring seal between and spaced from said flanges;
the valve seat opening in said main valve member is elongated and has a flared rounded edge facing said spool valve; and
the peripheral diameter of the O-ring is greater than said flanges and greater than the internal diameter of the elongated portion of said valve seat opening.

8. A low pressure self-closing hand-operated valve comprising:
a housing member defining an elongate frusto-conical valve chamber, a handle section and a nozzle section;
said valve chamber having a substantially uniform taper with an open end at the portion of larger diameter and a closed end at the portion of smaller diameter;
an outlet passageway communicating from said portion of larger diameter into said nozzle section;
said handle section being tubular to define the inlet passageway for said valve and communicating with said valve chamber at a portion of intermediate diameter axially spaced from said outlet passageway and from said closed end;
a guide chamber defined within the portion of said valve chamber having the lesser diameter;
a tapered plug member adapted to fit within that portion of said valve chamber of greater diameter;
intersecting bores in said plug member;
one of said bores being axially aligned with said valve chamber and presenting a transverse wall facing and spaced from the open end of said valve chamber, with a circumferential retaining edge oriented between said portions of greater and intermediate diameters of said valve chamber;
the other of said bores registering with said outlet passageway;
a valve stem slidably supported by said transverse wall having a finger knob at the end outside said housing with the other end extending axially within said guide chamber and spaced from the closed end thereof;
means sealing the transverse wall of said plug member within said valve chamber and about said valve stem;
an annular resilient valve seat member adjacent said retaining edge of said plug member;
said valve seat member having a pair of outwardly flared flanges disposed on the side opposite said retaining edge with the outermost flange engaging said valve chamber and the inner flange defining a resilient valve seat;
a main valve having an outer tapered surface adapted to nest within said resilient valve seat and having a tapered center bore encompassing and spaced from said valve stem;

axial support means extending from said main valve through said portion of said valve chamber having an intermediate diameter;

inner and outer spaced radial support means affixed between said axial support means and slidably engaging said valve stem at its extended end, the outermost thereof being slidably retained within said guide chamber;

a stop member affixed to said valve stem between said radial support means and adapted to alternately engage said support means upon reciprocation of said valve stem;

a pilot valve member carried by said valve stem and adapted to be moved to and from a sealed position within the center bore of said main valve within the limits of reciprocation of said stop member between said radial support means as the initial opening position of said valve; and said valve stem stop member and radial support being movable into said guide chamber to thereby open said main valve against the flow of fluid from said inlet passageway as the final opening position of said valve with said inner radial support means and both of said valve member being subject to a closing force by said fluid stream.

9. A valve in accordance with claim 8 in which:
said inner and outer radial support means comprises a pair of plate members affixed to and spaced along said axial supports;
the outer of said plate members being in slidable relationship with said guide means and the inner of said plate members being within the inlet flow stream of said valve.

10. A valve in accordance with claim 8 in which:
said pilot valve member includes a cylindrical body and a flange having an outside diameter greater than the smallest inner diameter of said pilot valve seat.

11. A valve in accordance with claim 10 in which said circumferential seal member is an O-ring and a second flange is provided on said cylindrical body spaced from first flange to retain said "O" ring thereon.

12. A valve in accordance with claim 8 in which: the open end of said valve chamber includes a closure member in sealed relationship therein and providing a central opening encompassing said valve actuating stem;

said inlet and outlet passageways are radially disposed and longitudinally spaced on each side of said main valve seat;

said valve chamber tapers from said outlet to said inlet passageway; and a tapered plug member is provided having an opening registering with said outlet passageway and includes an opening having a radial surface comprising said main valve seat.

13. A valve comprising:
housing means defining a handle portion, an elongate valve chamber transverse to said handle portion and outlet passageway;

an inlet passageway communicating with said valve chamber and spaced from said closed end;

an outlet passageway communicating with said valve chamber and spaced from said open end;

guide means in said valve chamber between said closed end and said inlet passageway;

a circumferential valve seat in said valve chamber between said inlet and outlet passageways and facing said guide chamber;

a valve actuating stem extending into said valve chamber and slidably carried between said open end and said guide means;

a main valve member adapted to close upon said valve seat;

said main valve member having an opening therethrough defining a pilot valve seat;

a pilot valve member affixed to said valve actuating stem and adapted to close upon said pilot valve seat in said main valve member;

lost motion connecting means between said valve actuating stem and said main including longitudinally spaced radial support means affixed to said main valve member;

said support means providing guided reciprocable movement to and from said guide chamber and including a stop member affixed to said valve actuating stem between said support means;

said stop member being movable between said support means during the opening of said pilot valve with said main valve closed and adapted to engage therewith after the opening of said pilot valve to open said main valve.

* * * * *